United States Patent
Chang et al.

(10) Patent No.: US 11,927,752 B2
(45) Date of Patent: Mar. 12, 2024

(54) CONTROL METHOD AND MOBILE DEVICE IN IMMERSIVE SYSTEM

(71) Applicant: HTC Corporation, Taoyuan (TW)

(72) Inventors: Yi-Hsin Chang, Taoyuan (TW); Kuan-Wei Li, Taoyuan (TW)

(73) Assignee: HTC Corporation, Taoyuan (TW)

( * ) Notice: Subject to any disclaimer, the term of this patent is extended or adjusted under 35 U.S.C. 154(b) by 0 days.

(21) Appl. No.: 17/938,677

(22) Filed: Oct. 7, 2022

(65) Prior Publication Data
US 2023/0258934 A1    Aug. 17, 2023

Related U.S. Application Data

(60) Provisional application No. 63/268,065, filed on Feb. 16, 2022.

(51) Int. Cl.
*G02B 27/01* (2006.01)
*G06F 3/01* (2006.01)
*G06F 3/0488* (2022.01)

(52) U.S. Cl.
CPC .......... *G02B 27/017* (2013.01); *G06F 3/011* (2013.01); *G06F 3/0488* (2013.01)

(58) Field of Classification Search
CPC ..... G02B 27/017; G06F 3/011; G06F 3/0488; G06F 3/041; H04N 21/4312; H04N 21/431
See application file for complete search history.

(56) References Cited

U.S. PATENT DOCUMENTS

| | | | | |
|---|---|---|---|---|
| 2017/0329419 A1* | 11/2017 | Dearman | ............... | G06F 3/0346 |
| 2017/0364198 A1* | 12/2017 | Yoganandan | ......... | G06F 3/0488 |
| 2019/0174088 A1 | 6/2019 | Kim et al. | | |
| 2022/0011861 A1* | 1/2022 | Horii | ................... | G06F 3/04883 |

FOREIGN PATENT DOCUMENTS

| | | |
|---|---|---|
| CN | 109144378 A | 1/2019 |
| CN | 113467625 A | 10/2021 |
| TW | 201907994 A | 3/2019 |
| TW | 202109244 A | 3/2021 |

OTHER PUBLICATIONS

The Office Action of corresponding TW111141256 dated Mar. 6, 2023.

* cited by examiner

*Primary Examiner* — Matthew A Eason
*Assistant Examiner* — Chayce R Bibbee
(74) *Attorney, Agent, or Firm* — CKC & Partners Co., LLC

(57) ABSTRACT

A control method for an immersive system includes following steps. A communication is established between a mobile device and a head-mounted display device. Pose data of the mobile device is captured. A touch event is detected by a touch screen on the mobile device. An interface layout is defined on the touch screen, and the interface layout includes a plurality of functional regions. A target function is selected from candidate functions by mapping a position of the touch event with one of the functional regions in the interface layout. The target function is executed and an immersive content displayed by the head-mounted display device is rendered according to the target function and the pose data.

15 Claims, 10 Drawing Sheets

(54) CONTROL METHOD AND MOBILE DEVICE IN IMMERSIVE SYSTEM

RELATED APPLICATIONS

This application claims the priority benefit of U.S. Provisional Application Ser. No. 63/268,065, filed Feb. 16, 2022, which is herein incorporated by reference.

BACKGROUND

Field of Invention

The disclosure relates to a mobile device in an immersive system. More particularly, the disclosure is about utilizing the mobile device as a handheld controller to control a head-mounted display device in the immersive system.

Description of Related Art

Virtual Reality (VR), Augmented Reality (AR), Substitutional Reality (SR), and/or Mixed Reality (MR) devices are developed to provide immersive experiences to users. When a user wearing a head-mounted display (HMD) device, the visions of the user will be covered by an immersive content (e.g., a virtual world in an outer space) shown on the head-mounted display device. While the user wearing the head-mounted display device, the user may hold custom-made controllers in their hands and manipulate the custom-made controller for interacting with virtual objects in the immersive content.

SUMMARY

The disclosure provides a control method including following steps. A communication is established between a mobile device and a head-mounted display device. Pose data of the mobile device is captured. A touch event is detected by a touch screen on the mobile device. An interface layout is defined on the touch screen, and the interface layout includes a plurality of functional regions. A target function is selected from candidate functions by mapping a position of the touch event with one of the functional regions in the interface layout. The target function is executed and an immersive content displayed by the head-mounted display device is rendered according to the target function and the pose data.

The disclosure provides a mobile device, which includes a communication circuit, a touch screen and a processing circuit. The communication circuit is configured to communicate with a head-mounted display device. The touch screen is configured to detect a touch event. The processing circuit is coupled with the communication circuit and the touch screen. The processing circuit is configured to process the touch event in reference with an interface layout defined on the touch screen, the interface layout comprising a plurality of functional regions. The processing circuit is configured to select a target function from candidate functions by mapping a position of the touch event with one of the functional regions in the interface layout. The processing circuit is configured to transmit a control signal to the head-mounted display device for activating the target function.

The disclosure provides a head-mounted display device, which includes a communication circuit, a display module and a tracking circuit. The communication circuit is configured to communicate with a mobile device. The display module is configured to display an immersive content. The tracking circuit is configured to capture pose data of the mobile device. The processing circuit is coupled with the communication circuit, the display module and the tracking circuit. The processing circuit is configured to render a virtual controller in the immersive content according to the pose data of the mobile device. The processing circuit is configured to receive a control signal from the mobile device for activating a target function corresponding to a touch event detected by the mobile device. The processing circuit is configured to execute the target function and render the immersive content according to the target function and the pose data.

It is to be understood that both the foregoing general description and the following detailed description are demonstrated by examples, and are intended to provide further explanation of the invention as claimed.

BRIEF DESCRIPTION OF THE DRAWINGS

The disclosure can be more fully understood by reading the following detailed description of the embodiment, with reference made to the accompanying drawings as follows.

DETAILED DESCRIPTION

Figure 1A:
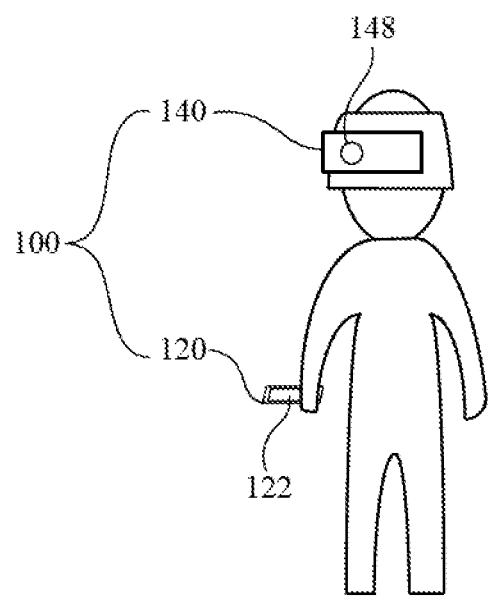
FIG. 1A is a schematic diagram illustrating an immersive system according to some embodiments of the disclosure.

Reference will now be made in detail to the present embodiments of the disclosure, examples of which are illustrated in the accompanying drawings. Wherever possible, the same reference numbers are used in the drawings and the description to refer to the same or like parts.

Reference is made to FIG. 1A, which is a schematic diagram illustrating an immersive system 100 according to some embodiments of the disclosure. As shown in FIG. 1A, the immersive system 100 includes a mobile device 120 and a head-mounted display device 140. In some embodiments, the immersive system 100 can be a Virtual Reality (VR), Augmented Reality (AR), Substitutional Reality (SR), and/or Mixed Reality (MR) system for providing an immersive experience to a user. While the user wears the head-mounted display device 140, the head-mounted display device 140 may cover visions of the user, such that the user can dive into a virtual world based on an immersive content displayed on the head-mounted display device 140. For example, the immersive content may include a background in an outer space and some relative objects, such as spaceships, aliens, stars or other objects.

In some immersive systems, the user is required to purchase custom-made controllers and utilize the custom-made controllers as input devices. The user may hold these custom-made controllers in their hands and manipulate them for interacting with virtual objects in the immersive content. In this case, these custom-made controllers may increase an overall cost of these immersive systems. In the meantime, these custom-made controllers are not useful outside the immersive systems.

In some embodiments of the disclosure, the mobile device 120 can be utilized as a handheld controller of the immersive system 100. The mobile device 120 is communicatively connected with the head-mounted display device 140. The mobile device 120 is able to detect user's input, and provide a control signal to the head-mounted display device 140 for activating a target function on the head-mounted display device 140. In some embodiments, the mobile device 120 can be realized by a smartphone, a mobile phone or a personal digital assistant (PDA) device. In this case, the user can use his/her own smartphone as the handheld controller of the immersive system 100, and the user is not required to purchase the custom-made controllers for the immersive system 100.

Figure 1B:
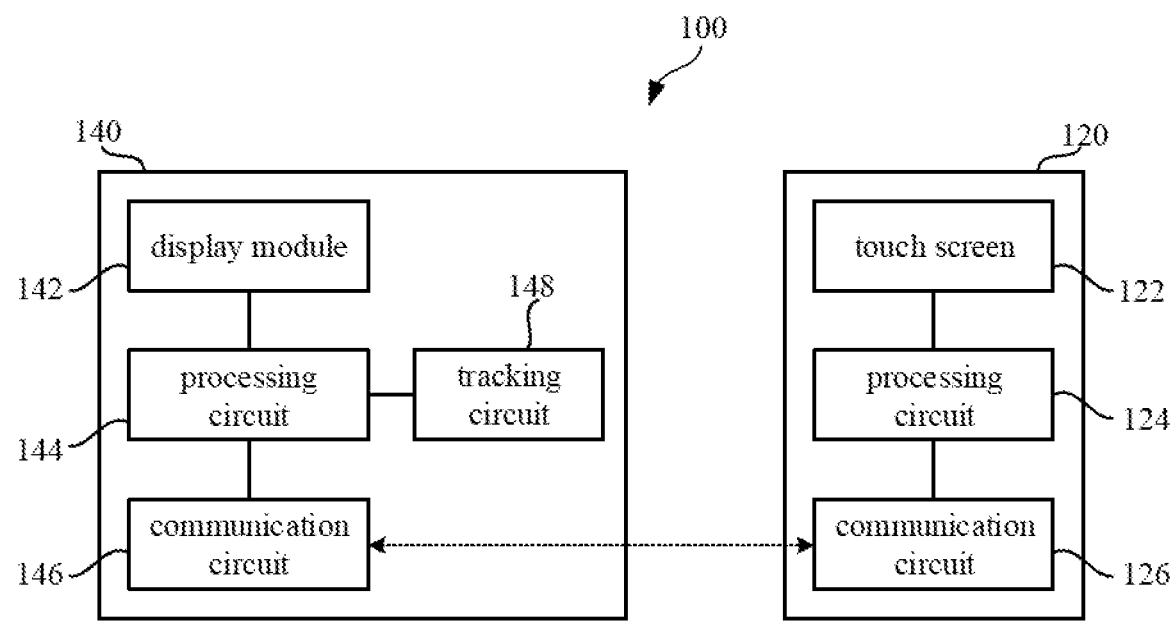
FIG. 1B is a function block diagram illustrating the mobile device and the head-mounted display device as shown in FIG. 1A in some embodiments of the disclosure.
Figure 2:
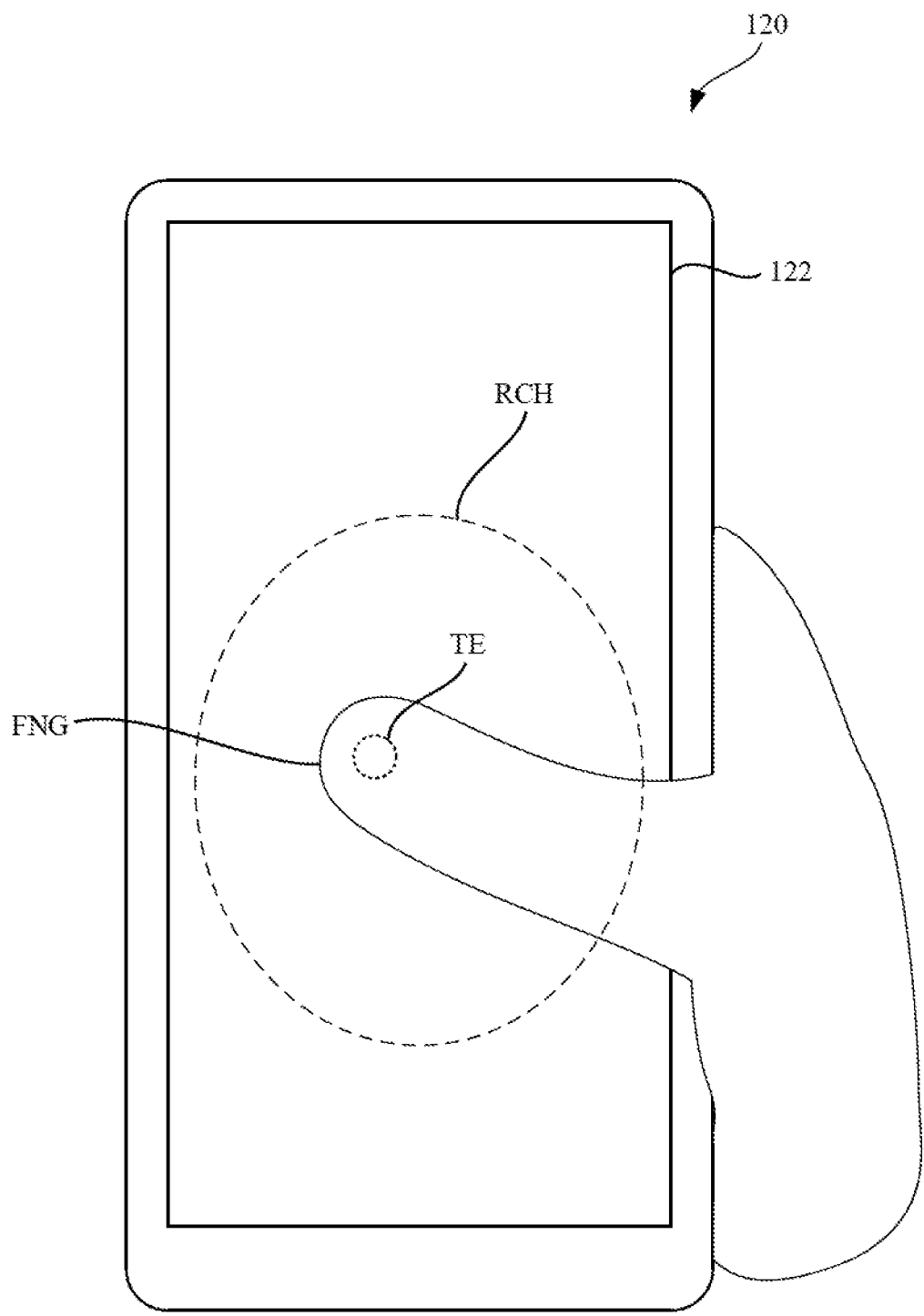
FIG. 2 is a schematic diagram illustrating that the mobile device is hold in one hand of the user in some embodiments.

Reference is made to FIG. 1B and FIG. 2. FIG. 1B is a function block diagram illustrating the mobile device 120 and the head-mounted display device 140 as shown in FIG. 1A in some embodiments of the disclosure. FIG. 2 is a schematic diagram illustrating that the mobile device 120 is hold in one hand of the user in some embodiments. As shown in FIG. 1B, the mobile device 120 includes a touch screen 122, a processing circuit 124 and a communication circuit 126. As shown in FIG. 2, the touch screen 122 is configured to detect a touch event TE corresponding to a finger contact FNG on a specific position of the touch screen 122. In some embodiments, the touch screen 122 can be implemented by a capacitive touch panel, a resistive touch panel, an optical-sensing touch panel, a pressure-sensing touch panel or any similar touch screen.

The processing circuit 124 is coupled with the touch screen 122 and the communication circuit 126. In some embodiments, the processing circuit 124 can be implemented by a central processing unit, a graphic processing unit, a tensor processor, an application specific integrated circuit (ASIC) or any similar processor. The communication circuit 126 is configured to establish a communication connection to the head-mounted display device 140. In some embodiments, the communication circuit 126 can be implemented by a Bluetooth transceiver, a BLE transceiver, a WiFi transceiver, a Zigbee transceiver or any similar communication circuit.

Figure 3:
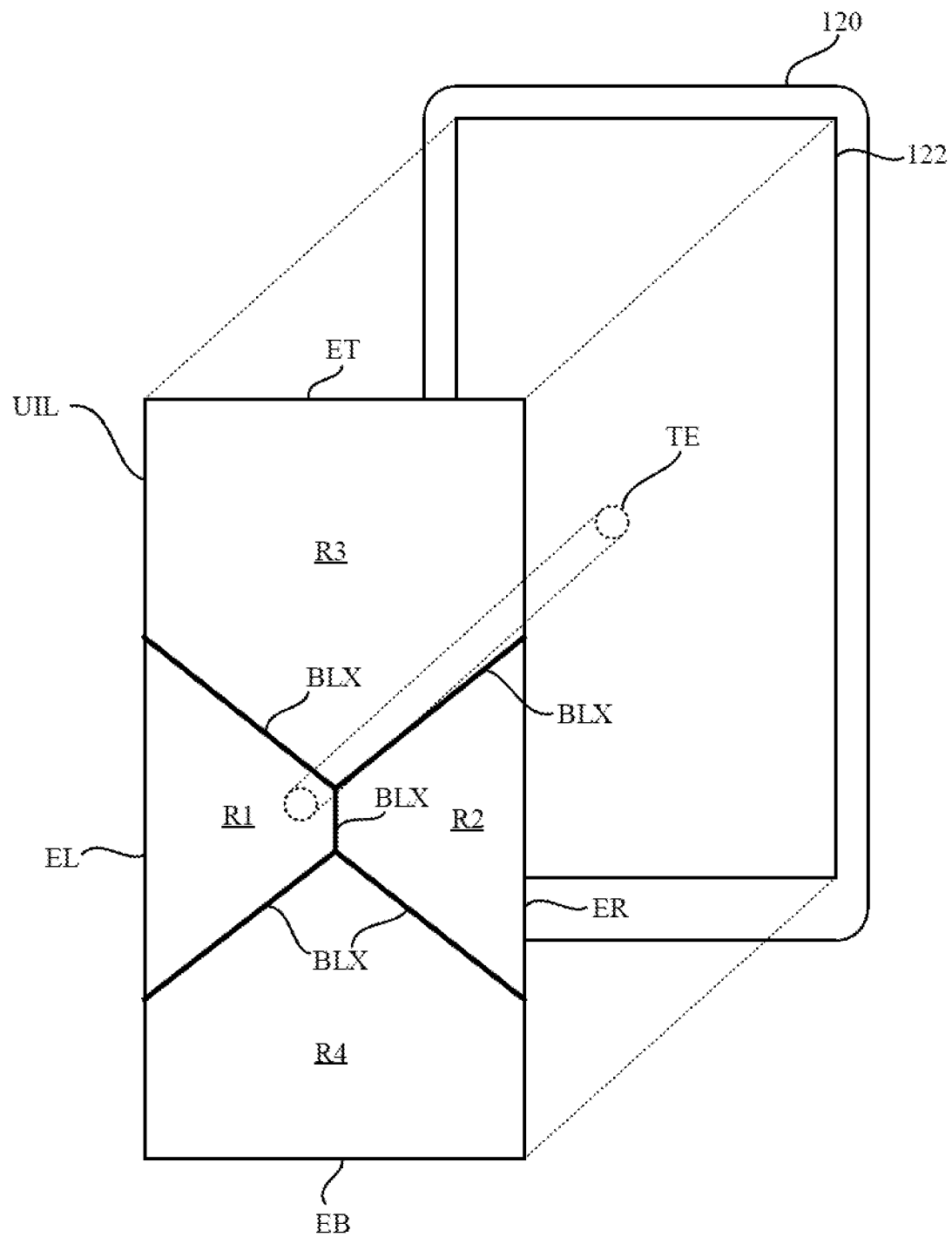
FIG. 3 is a schematic diagram illustrating an embodiment of the interface layout defined on the touch screen.

In some embodiments, the processing circuit 124 is configured to process the touch event TE in reference with an interface layout defined on the touch screen 122, so as to select a target function based on the outcome. Reference is further made to FIG. 3, which is a schematic diagram illustrating an embodiment of the interface layout UIL defined on the touch screen 122. As shown in FIG. 3, the interface layout UIL includes four functional regions R1, R2, R3 and R4. Based on a position of the user's finger contact FNG, one target function corresponding to one of the functional regions R1-R4 can be selected. In this case, the mobile device 120 can be utilized as a handheld controller with four functional buttons.

The head-mounted display device 140 includes a display module 142, a processing circuit 144, a communication circuit 146 and a tracking circuit 148. The display module 142 is configured to display the immersive content to the user. In some embodiments, the display module 142 may include one or more display panel(s), lens and/or a panel shifting structure. The processing circuit 144 is coupled with the display module 142, the communication circuit 146 and the tracking circuit 148. In some embodiments, the processing circuit 144 can be implemented by a central processing unit, a graphic processing unit, a tensor processor, an application specific integrated circuit (ASIC) or any similar processor. The communication circuit 146 is configured to establish a communication connection to the mobile device 120. In some embodiments, the communication circuit 146 can be implemented by a Bluetooth transceiver, a BLE transceiver, a WiFi transceiver, a Zigbee transceiver or any similar communication circuit.

The tracking circuit 148 is configured to track the mobile device 120 and generate pose data of the mobile device 120. In some embodiments, the tracking circuit 148 can be implemented by a camera with a computer vision algorithm, an optical sensor, a radar sensor, or any similar tracking circuit. The pose data is configured to indicate a relative position and/or a relative orientation between the mobile device 120 and the head-mounted display device 140.

Figure 4:
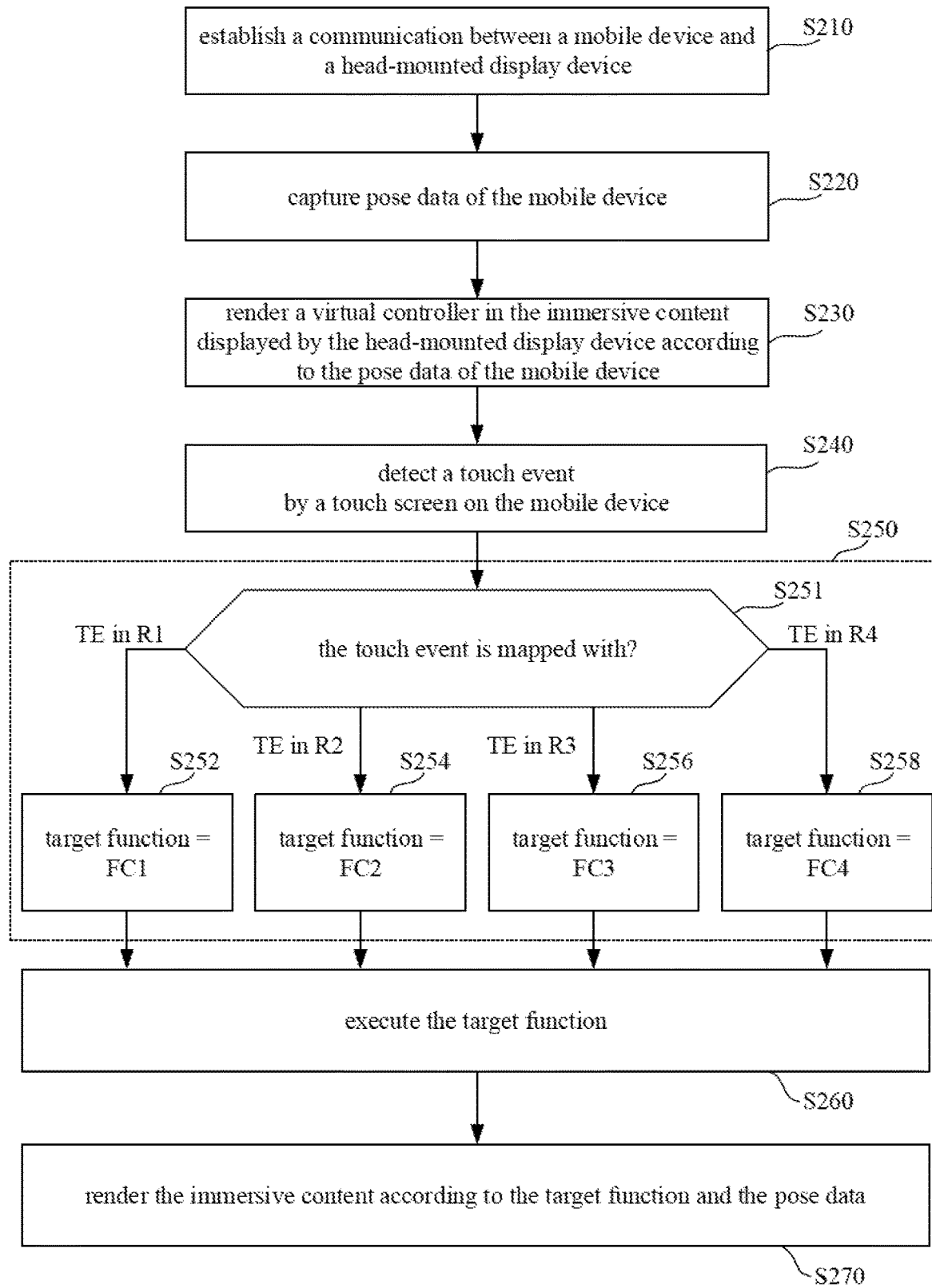
FIG. 4 is a flow chart illustrating a control method executed by the immersive system as shown in FIG. 1A and FIG. 1B.

Reference is further made to FIG. 4, which is a flow chart illustrating a control method 200 executed by the immersive system 100 as shown in FIG. 1A and FIG. 1B. As shown in FIG. 4, step S210 is executed to establish a communication between the mobile device 120 and the head-mounted display device 140. In some embodiments, the communication circuit 126 of the mobile device 120 and the communication circuit 146 of the head-mounted display device 140 can established a wireless connection (e.g., a Bluetooth connection) between two devices.

Step S220 is executed to capture pose data of the mobile device 120. In some embodiments, the pose data can be captured by the tracking circuit 148 (e.g., a tracking camera disposed on the head-mounted display device 140 as shown in FIG. 1A) of the head-mounted display device 140. In some other embodiments, the pose data may further include data generated by an inertial measurement unit (IMU) disposed in the mobile device 120 and/or the head-mounted display device 140. In other words, the pose data is not limited to only the tracking data generated by the tracking circuit 148.

Figure 5A:
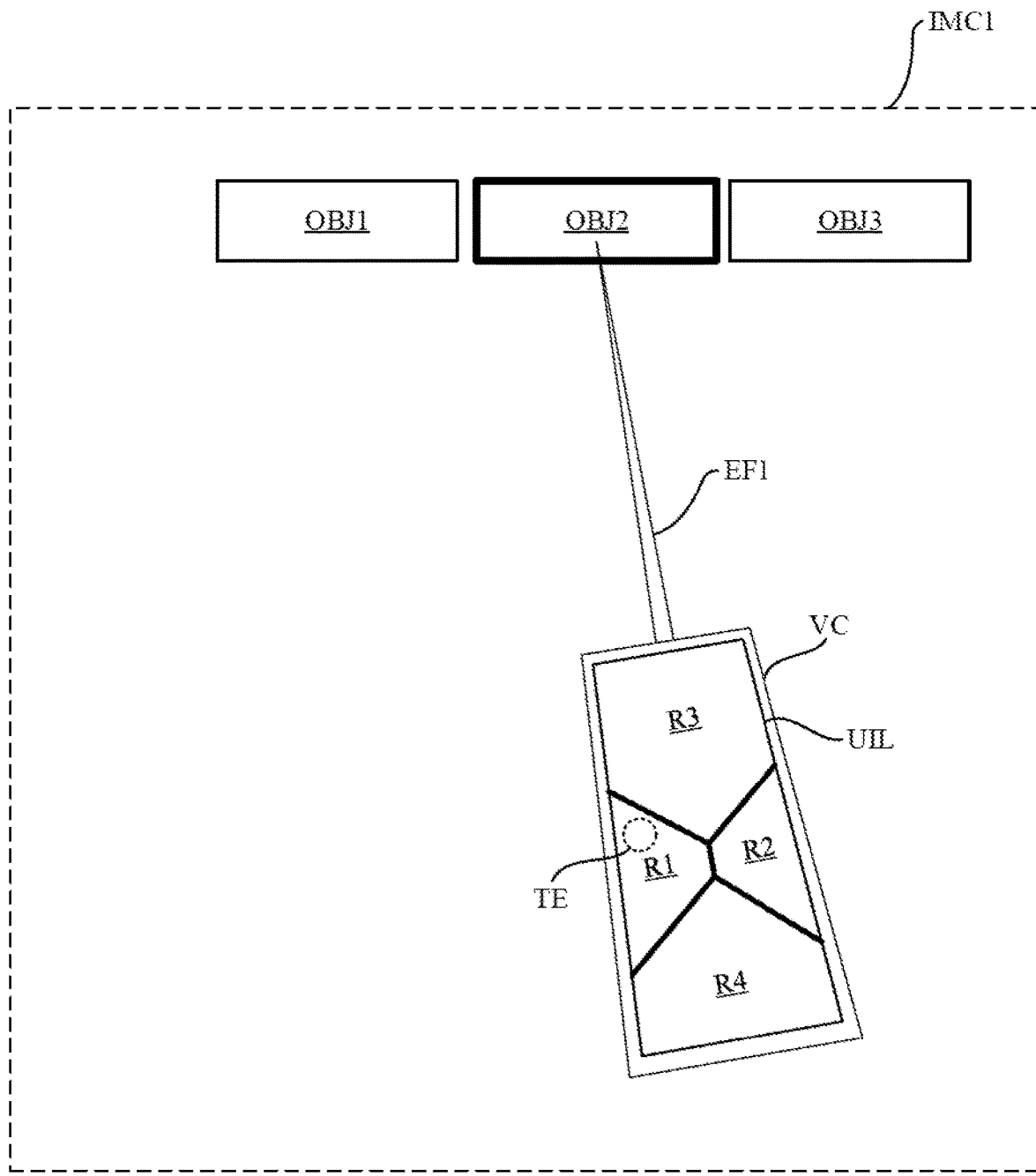
FIG. 5A is a schematic diagram illustrating a first scenario of the immersive content displayed by the display module of the head-mounted display device when the touch event is located in a functional region.

Step S230 is executed, by the processing circuit 144 of the head-mounted display device 140, to render a virtual controller in the immersive content displayed by the display module 142 of the head-mounted display device 140 according to the pose data of the mobile device 120. Reference is further made to FIG. 5A, which is a schematic diagram illustrating a first scenario of the immersive content IMC1 displayed by the display module 142 of the head-mounted display device 140 when the touch event TE is located in the functional region R1. As shown in FIG. 5A, the virtual controller VC corresponding to the mobile device 120 is rendered and shown in the immersive content IMC1. A position and an orientation of the virtual controller VC appeared in the immersive content IMC1 is determined by the pose data of the mobile device 120. When the user moves or rotates the mobile device 120 with his/her hand, the pose data will change and the virtual controller VC appeared in the immersive content IMC1 will move or rotate correspondingly.

As shown in FIG. 1B, FIG. 3 and FIG. 4, step S240 is executed to detect the touch event TE by the touch screen 122. In some embodiments, the touch event TE is detected in reference with the interface layout UIL defined on the touch screen 122. As shown in FIG. 3, the interface layout UIL includes four functional regions R1-R4, which are isolated from each other. In some embodiments shown in FIG. 3, the functional regions R1-R4 are isolated from each other by X-shaped boundary lines BLX.

These X-shaped boundary lines BLX divide the interface layout UIL (and the touch screen 122) into four regions. The functional region R1 is arranged on a left side at a middle level of the interface layout UIL, and located between a left edge EL of the interface layout UIL and the X-shaped boundary lines BLX. The functional region R2 is arranged on a right side at a middle level of the interface layout UIL, and located between a right edge ER of the interface layout UIL and the X-shaped boundary lines BLX. The functional region R3 is arranged on a top side of the interface layout UIL, and located between a top edge ET of the interface layout UIL and the X-shaped boundary lines BLX. The functional region R4 is arranged on a bottom side of the interface layout UIL, and located between a bottom edge EB of the interface layout UIL and the X-shaped boundary lines BLX.

The functional regions R1-R4 can be utilized as four different buttons on the handheld controller of the immersive system 100. As shown in FIG. 2, when the user holds the mobile device 120 in one hand and manipulate on the touch screen 122, there is a reachable range RCH of user's finger contact FNG. The reachable range RCH is usually a circular area around the center of the touch screen 122 as shown in FIG. 2. The reachable range RCH will vary according to a length of the user's finger.

In order to meet this one-handed operation situation, each of the four functional regions R1-R4 as shown in FIG. 3 has at least a part overlapping with the reachable range RCH of the finger contact FNG as shown in FIG. 2. For example, at least the rightmost corner of the functional region R1 is covered in the reachable range RCH; at least the leftmost corner of the functional region R2 is covered in the reachable range RCH; at least the bottommost corner of the functional region R3 is covered in the reachable range RCH; and, at least the upmost corner of the functional region R4 is covered in the reachable range RCH. Therefore, the finger contact FNG can easily reach each one of the functional regions R1-R4 in the interface layout UIL.

The positions and the arrangement of the four functional regions R1-R4 in the interface layout UIL have been extensively tested to be reachable by most users with different finger lengths. In addition, the positions and the arrangement of the four functional regions R1-R4 in the interface layout UIL have been extensively tested on various mobile devices with different sizes of touch screens, and the four functional regions R1-R4 can remain in the reachable range RCH.

As shown in FIG. 3 and FIG. 4, step S250 is executed to select a target function from candidate functions by mapping a position of the touch event TE with one of the functional regions R1-R4 in the interface layout UIL. As shown in FIG. 4, step S250 includes steps S251 to S258. In some embodiments, the candidate functions may include various functions which can be executed on the head-mounted display device 140 or the immersive system 100. For example, the candidate functions in some embodiments can include an item-selecting function FC1, a trigger function FC2, a control menu function FC3 and an application listing function FC4. However, the candidate functions are not limited thereto.

At first, step S251, is executed, by the processing circuit 124 of the mobile device 120 or by the processing circuit 144 of the head-mounted display device 140, to determine which one of the functional regions R1-R4 the position of the touch event TE maps with. In other words, step S251 is configured to distinguish where the finger contact FNG lands on the position of the touch event TE.

If the user touches on the left side of the interface layout UIL within the functional region R1, such that the position of the touch event TE will be mapped within the functional region R1. In this case, step S252 is executed to select an item selecting function FC1 as the target function. In this case, the mobile device 120 may transmit a control signal to the head-mounted display device 140 for activating the target function (i.e., the item selecting function FC1), and the head-mounted display device 140 is configured to execute the target function accordingly.

As shown in FIG. 4 and FIG. 5A, when the position of the touch event TE locates within the functional region R1, step S260 is executed by the processing circuit 144 of the head-mounted display device 140, to execute the target function (i.e., the item selecting function FC1), and step S270 is executed by the processing circuit 144 of the head-mounted display device 140 to render the immersive content IMC1 according to the target function and the pose data.

As shown in FIG. 5A, the processing circuit 144 renders a first scenario in the immersive content IMC1 about selecting an item (e.g., a virtual object OBJ2) along a direction of the virtual controller VC. In the first scenario in the immersive content IMC1, an indicator beam effect EF1 is displayed in the immersive content IMC1 and extended from the top of the virtual controller VC. The indicator beam effect EF1 can be manipulated by the user to point and select an item in the immersive content IMC1. As shown in FIG. 5A, a virtual object OBJ2 is selected by the user at this moment. If the user tends to select another item, he/she can move the mobile device 120 (i.e., the virtual controller VC) to select another virtual object OBJ1 or OBJ3. The direction of the virtual controller VC is decided by the pose data of the mobile device 120.

It is noticed that, in some embodiments, the interface layout UIL is rendered on a surface of the virtual controller VC in the immersive content IMC1. In this case, the user wearing the head-mounted display device 140 can see the interface layout UIL through the immersive content IMC1. In some embodiments, the interface layout UIL is not displayed on the touch screen 122 of the mobile device 120, because the visions of the user are covered by the head-mounted display device 140. By not displaying the interface layout UIL on the touch screen 122, it may reduce power consumption on the mobile device 120. However, the disclosure is not limited thereto.

In some other embodiments, the interface layout UIL is displayed on the touch screen 122 of the mobile device 120, and is also rendered on a surface of the virtual controller VC in the immersive content IMC1.

If the user touches on the right side of the interface layout UIL within the functional region R2, such that the position of the touch event TE will be mapped within the functional region R2. In this case, step S254 is executed to select a trigger function FC2 as the target function. In this case, the mobile device 120 may transmit a control signal to the head-mounted display device 140 for activating the target function (i.e., the trigger function FC2), and the head-mounted display device 140 is configured to execute the target function accordingly.

Figure 5B:
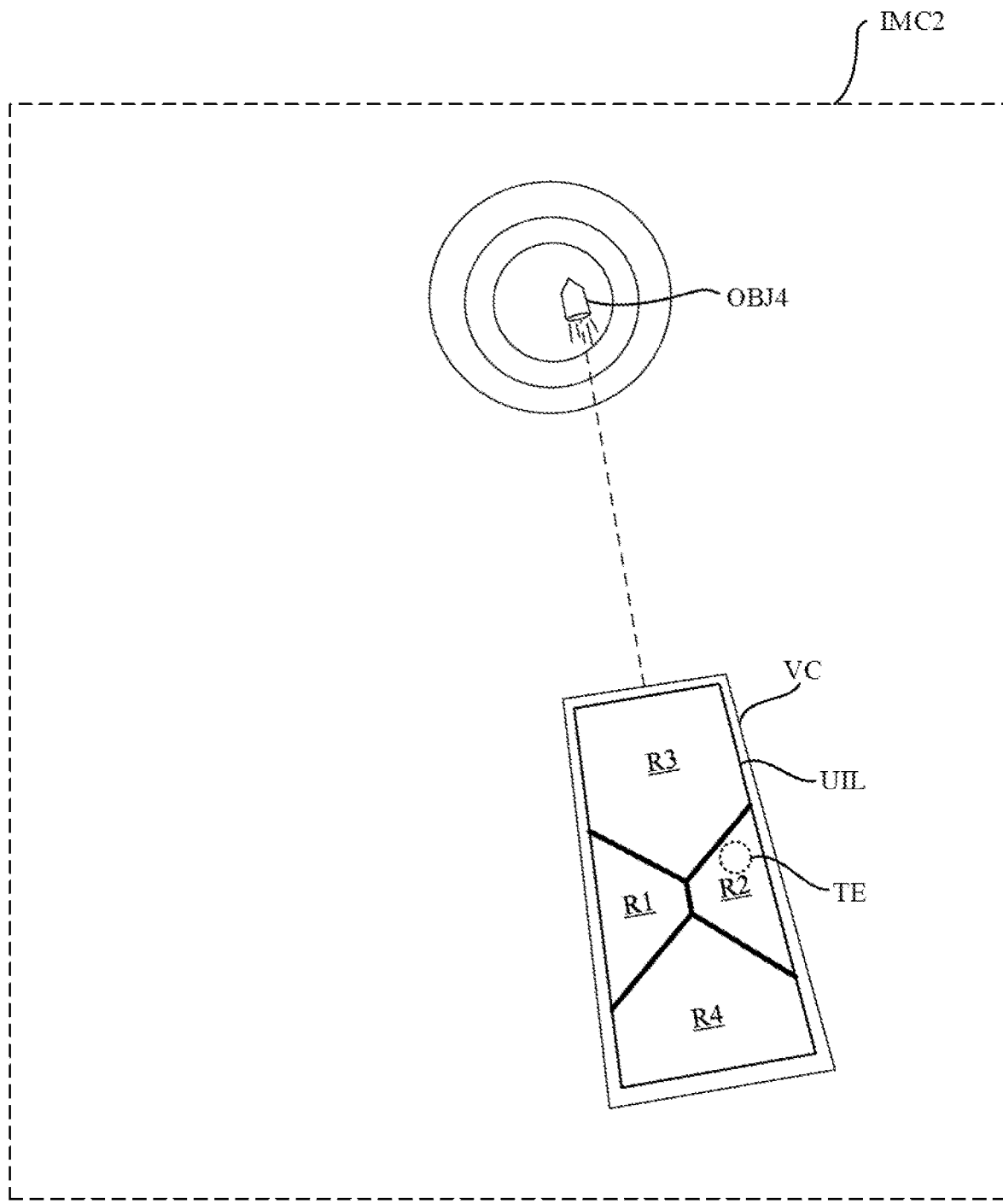
FIG. 5B is a schematic diagram illustrating a second scenario of the immersive content displayed by the display module of the head-mounted display device when the touch event is located in another functional region.

Reference is further made to FIG. 5B, which is a schematic diagram illustrating a second scenario of the immersive content IMC2 displayed by the display module 142 of the head-mounted display device 140 when the touch event TE is located in the functional region R2.

As shown in FIG. 4 and FIG. 5B, when the position of the touch event TE locates within the functional region R2, step S260 and step S270 are performed by the processing circuit 144 of the head-mounted display device 140 to execute and render the immersive content according to the trigger function FC2 and the pose data.

As shown in FIG. 5B, the processing circuit 144 renders a second scenario in the immersive content IMC2 about pulling a trigger along a direction of the virtual controller VC. In the second scenario in the immersive content IMC2, a bullet OBJ4 is fired along the direction of the virtual controller VC in response to the trigger function FC2. In some embodiments, at each time that the touch event TE is detected on the functional region R2, at least one bullet OBJ4 is fired. In some embodiments, the trigger function FC2 facilitates the user to interact with a gaming program executed on the head-mounted display device 140 or the immersive system 100. For example, the head-mounted display device 140 may show an enemy or a shooting target in the immersive content IMC2, and the user can input the touch event TE on the functional region R2 to shoot the enemy or the shooting target in the immersive content IMC2. The direction of the virtual controller VC is decided by the pose data of the mobile device 120.

If the user touches on the top side of the interface layout UIL within the functional region R3, such that the position of the touch event TE will be mapped within the functional region R3. In this case, step S256 is executed to select a control menu function FC3 as the target function. In this case, the mobile device 120 may transmit a control signal to the head-mounted display device 140 for activating the target function (i.e., the control menu function FC3), and the head-mounted display device 140 is configured to execute the target function accordingly.

Figure 5C:
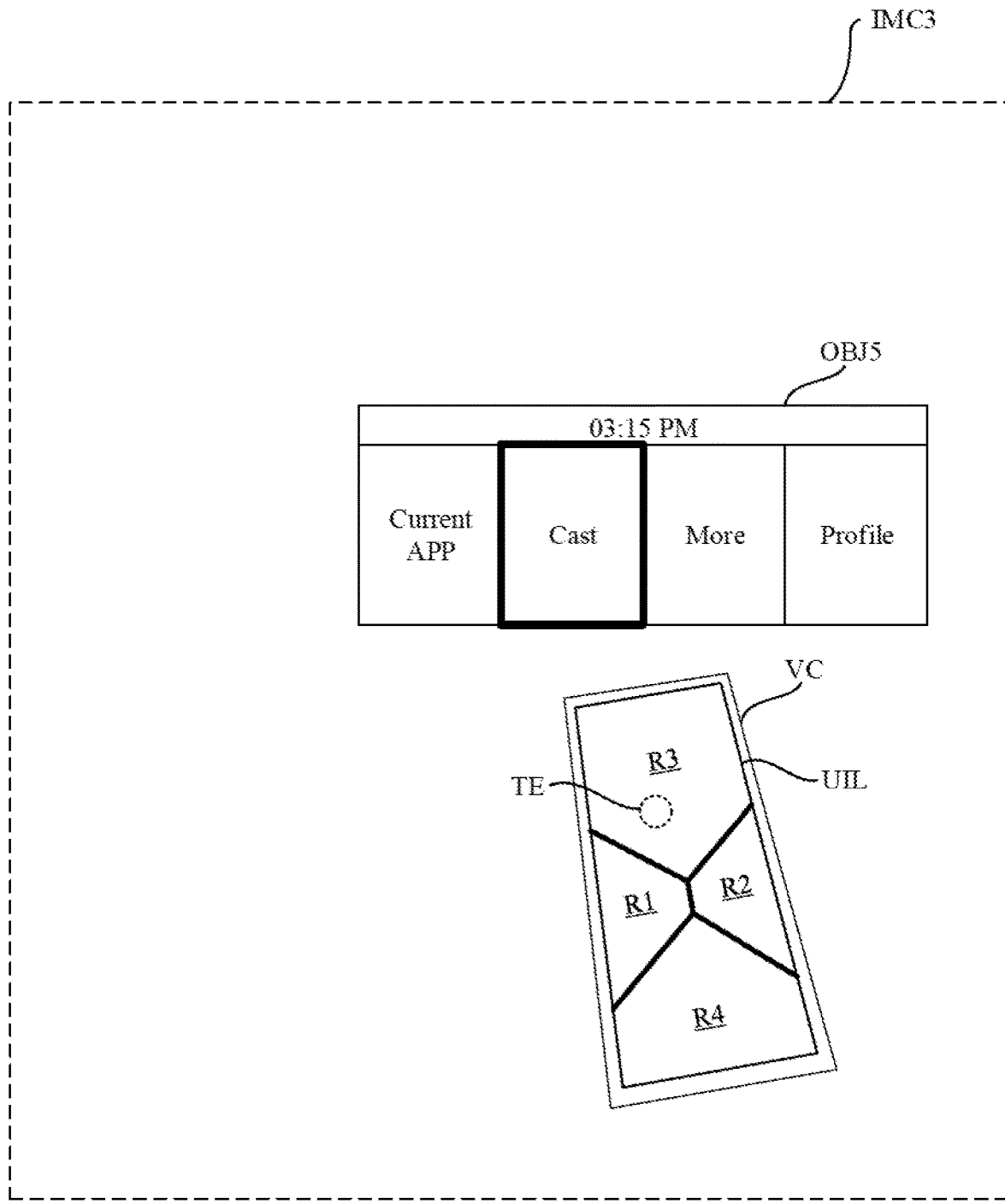
FIG. 5C is a schematic diagram illustrating a third scenario of the immersive content displayed by the display module of the head-mounted display device when the touch event is located in another functional region.

Reference is further made to FIG. 5C, which is a schematic diagram illustrating a third scenario of the immersive content IMC3 displayed by the display module 142 of the head-mounted display device 140 when the touch event TE is located in the functional region R3.

As shown in FIG. 4 and FIG. 5C, when the position of the touch event TE locates within the functional region R3, step S260 and step S270 are performed by the processing circuit 144 of the head-mounted display device 140 to execute and render the immersive content according to the control menu function FC3 and the pose data.

As shown in FIG. 5C, the processing circuit 144 renders the third scenario in the immersive content IMC3, which includes a control menu OBJ5 showed in front of the virtual controller VC. In some embodiments, the control menu OBJ5 may include some information (e.g., system time) and some function keys. The user can quickly enter the control menu OBJ5 by inputting the touch event TE on the functional region R3.

If the user touches on the bottom side of the interface layout UIL within the functional region R4, such that the position of the touch event TE will be mapped within the functional region R4. In this case, step S258 is executed to select an application listing function FC4 as the target function. In this case, the mobile device 120 may transmit a control signal to the head-mounted display device 140 for activating the target function (i.e., the application listing function FC4), and the head-mounted display device 140 is configured to execute the target function accordingly.

Figure 5D:
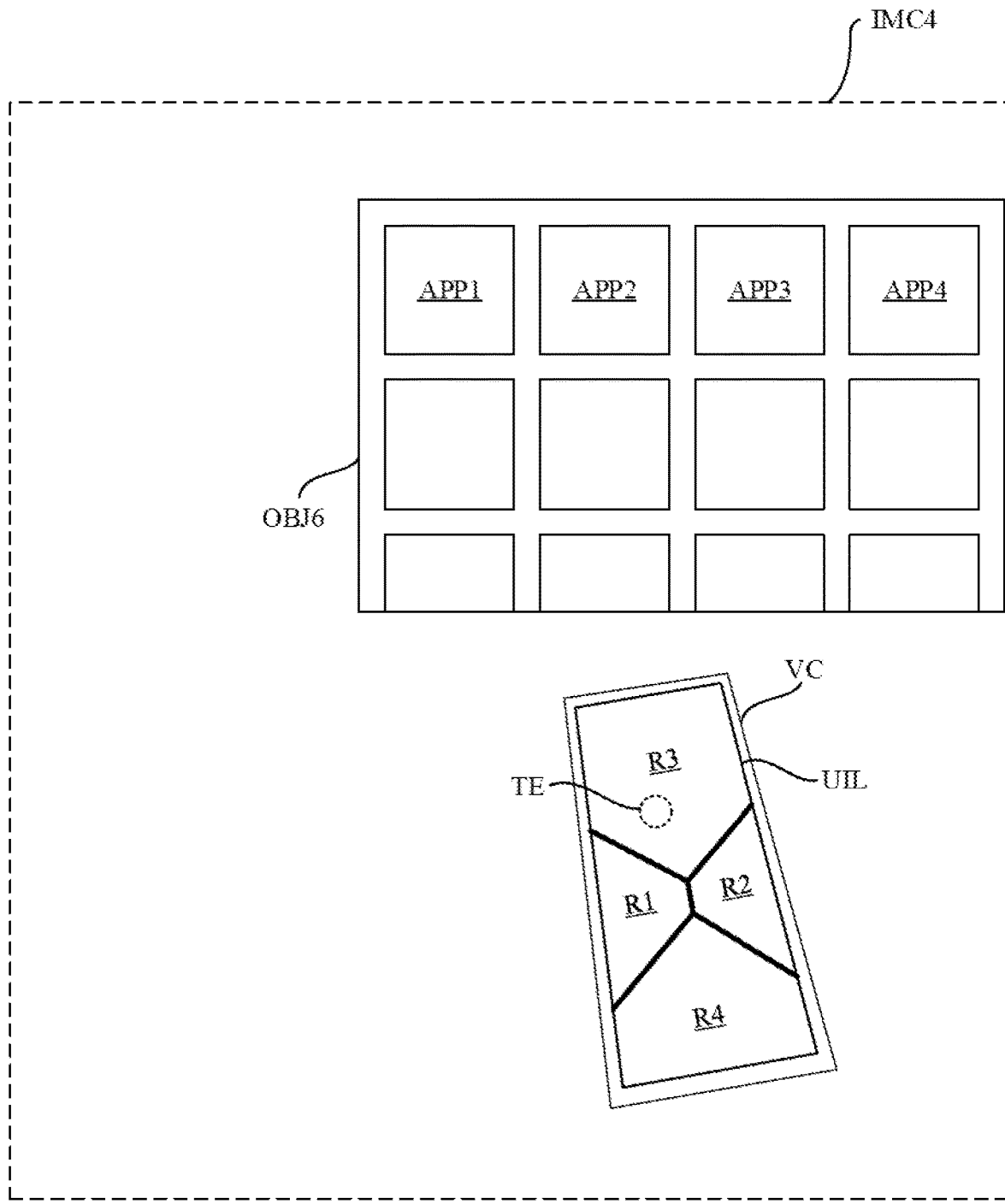
FIG. 5D is a schematic diagram illustrating a fourth scenario of the immersive content displayed by the display module of the head-mounted display device when the touch event is located in another functional region.

Reference is further made to FIG. 5D, which is a schematic diagram illustrating a fourth scenario of the immersive content IMC4 displayed by the display module 142 of the head-mounted display device 140 when the touch event TE is located in the functional region R4.

As shown in FIG. 4 and FIG. 5D, when the position of the touch event TE locates within the functional region R4, step S260 and step S270 are performed by the processing circuit 144 of the head-mounted display device 140 to execute and render the immersive content according to the application listing function FC4 and the pose data.

As shown in FIG. 5D, the processing circuit 144 renders the fourth scenario in the immersive content IMC4, which includes an application list OBJ6 showed in front of the virtual controller VC. In some embodiments, the application list OBJ6 may include shortcuts or entries to different application programs APP1, APP2, APP3 and APP4 as shown FIG. 5D. The user can access the application list OBJ6 by inputting the touch event TE on the functional region R4.

As discussed in aforesaid embodiments, the user can hold the mobile device 120 in one hand and manipulate the mobile device 120 as a controller of the immersive system 100. When the user induces one touch event TE, the touch event TE will trigger one target function on the head-mounted display device 140 in reference with the interface layout UIL defined on the touch screen 122. In this case, the user is not required to purchase a custom-made controller for the immersive system 100. In some embodiments, the user can install a software application with the interface layout UIL on a smart phone owned by the user. When the software application is launched on the smart phone, the smart phone can be utilized as the mobile device 120 in this disclosure.

Figure 6:
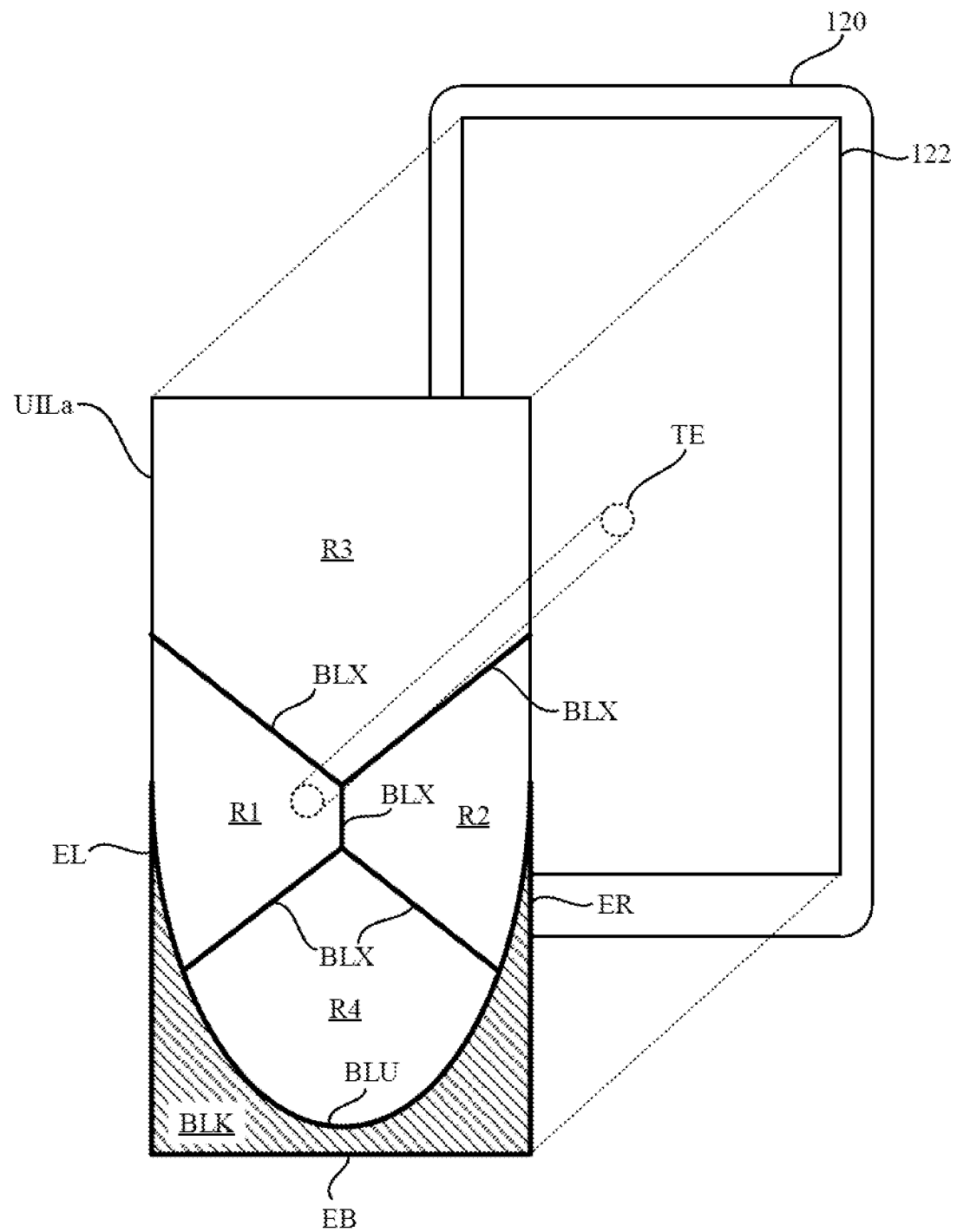
FIG. 6 is a schematic diagram illustrating another embodiment of the interface layout defined on the touch screen.

It is noticed that when the user inputs the touch event TE with his/her finger touch FNG over interface layout UIL defined on the touch screen 122, a palm of the user may accidentally contact on the touch screen 122 at the same time. If the mobile device 120 collect this unintended touch event, it will false-trigger some functions. For example, the application listing function will be false-triggered from time to time by the unintended touch event induced by the palm. Reference is further made to FIG. 6, which is a schematic diagram illustrating another embodiment of the interface layout UILa defined on the touch screen 122. As shown in FIG. 6, there are four functional regions R1-R4 and a blocked region BLK. The blocked region BLK is located between a U-shaped boundary line BLU, the left edge EL, the bottom edge EB and the right edge ER of the interface layout UILa. In this case, when the user inputs the touch event TE with his/her finger, some unintended touch events (e.g., induced by the palm of the user) can be blocked or filtered by the blocked region BLK, so as to increase validity of collected touch events. In some embodiments, the blocked region BLK is not rendered and not shown on the virtual controller VC appeared in the immersive content, in order to simplify a visible layout design to the user.

Figure 7:
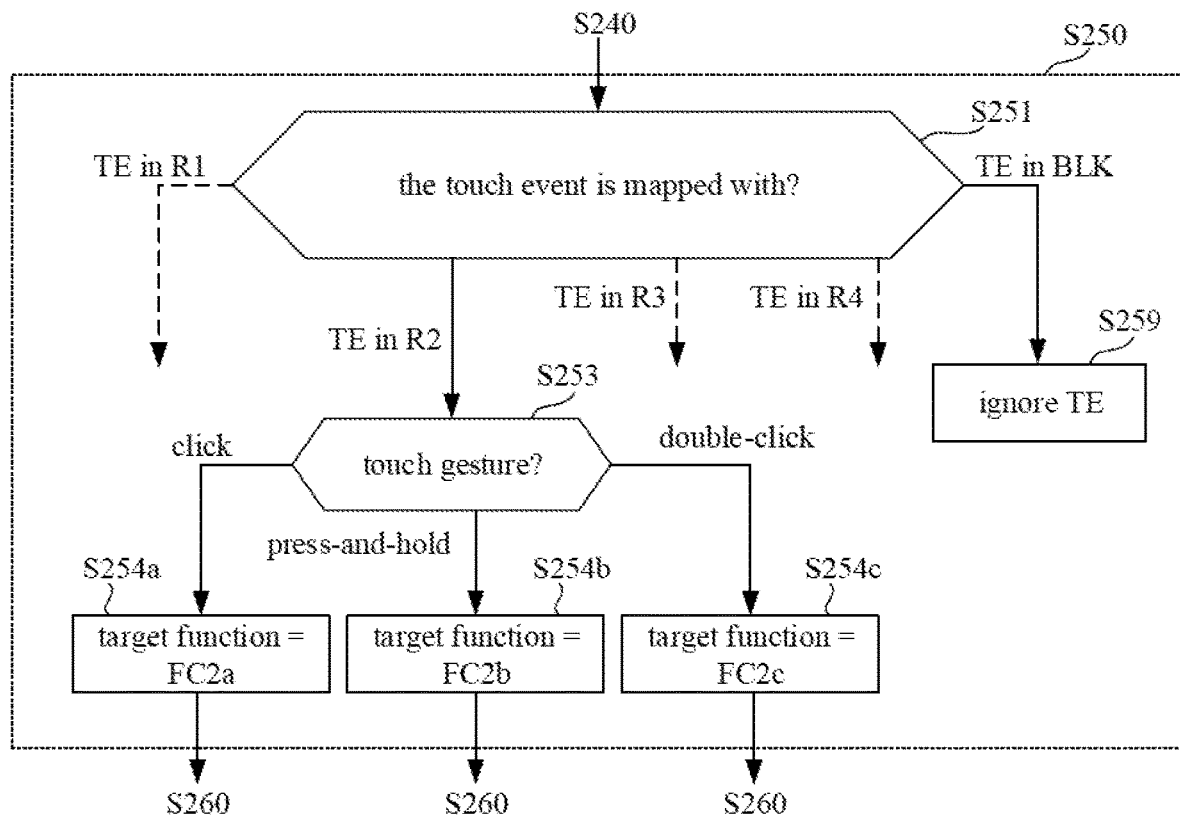
FIG. 7 is a flow chart diagram illustrating further details of one step in the control method in FIG. 4 according to some embodiments of the disclosure.

Reference is further made to FIG. 7, which is a flow chart diagram illustrating further details of the step S250 in the control method 200 in FIG. 4 according to some embodiments of the disclosure. As shown in embodiments shown in FIG. 6 and FIG. 7, step S251 is executed to map the position of the touch event TE with one of the four functional regions R1-R4 or the blocked region BLK. When the touch event TE is detected on the blocked region BLK, the touch event TE will be ignored as shown in step S259.

In this case, when the user inputs the touch event TE with his/her finger touch FNG, some false-triggers caused by the palm of the user can be ignored. It can prevent the immersive system 100 from activating some functions induced by some unintended touch events.

In aforesaid embodiments shown in FIG. 4, the target function is selected according to the position of the touch event TE. However, the disclosure is not limited thereto. In some embodiments, the target function is selected according to the position of the touch event TE and further according to a touch gesture of the touch event TE. In some embodiments, the touch gesture is one of click, double click and press-and-hold. As shown in FIG. 7, when the touch event TE is mapped within the functional region R2, step S253 is executed to classify a touch gesture of the touch event TE.

If the touch gesture of the touch event TE is a click (press once in a short time), a trigger function FC2a can be selected in step S254a as the target function. The trigger function FC2a can be utilized to shoot with a virtual gun or to activate a virtual object in the immersive content. If the touch gesture of the touch event TE is a press-and-hold (press down for a relatively longer time), a dragging function FC2b can be selected in step S254b as the target function. The dragging function FC2b can be utilized to hold a virtual object and drag the virtual object to another position in the immersive content. If the touch gesture of the touch event TE is a double-click (press twice in a short time), a releasing function FC2c can be selected in step S254c as the target function. The releasing function FC2c can be utilized to release a virtual object previously holding by an avatar of the user in the immersive content. In this case, in response to the touch event TE within the same functional region R2, different target functions can be selected further according to the touch gesture of the touch event TE.

For simplicity, other situations when the position of the touch event TE locates on the functional regions R1, R3 and R4 are not illustrated in FIG. 7; and the related steps can be referred to aforesaid embodiments discussed in steps S252, S256 and S258 in FIG. 4. In some other embodiments, when the position of the touch event TE locates on the functional regions R1, R3 and R4, a touch gesture may be considered to select the target function (similar to the steps S253, S254a, S254b and S254c shown in FIG. 7).

It is noticed that the target functions corresponding to different touch gestures and different functional regions discussed above are merely for demonstration. The immersive system 100 and the control method 200 can define different functions corresponding to different functional regions and different touch gestures.

Although the present invention has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims.

What is claimed is:

1. A control method, comprising:
    establishing a communication between a mobile device and a head-mounted display device;
    capturing pose data of the mobile device;
    detecting a touch event by a touch screen on the mobile device, wherein an interface layout is defined on the touch screen, and the interface layout comprises a plurality of functional regions, wherein the functional regions of the interface layout comprises a first functional region, a second functional region, a third functional region and a fourth function region, and the functional regions are isolated from each other, the functional regions are isolated from each other by X-shaped boundary lines, the first functional region is located between a left edge of the interface layout and the X-shaped boundary lines, the second functional region is located between a right edge of the interface layout and the X-shaped boundary lines, the third functional region is located between a top edge of the interface layout and the X-shaped boundary lines, and the fourth function region is located between a bottom edge of the interface layout and the X-shaped boundary lines;
    selecting a target function from candidate functions by mapping a position of the touch event with one of the functional regions in the interface layout; and
    rendering a virtual controller in an immersive content displayed by the head-mounted display device according to the pose data of the mobile device, wherein a direction of the virtual controller is decided by the pose data and points toward an item in the immersive content other than the virtual controller; and
    executing the target function on the item pointed by the virtual controller and rendering the immersive content displayed by the head-mounted display device according to the target function and the pose data.

2. The control method of claim 1, further comprising:
    rendering the interface layout on a surface of the virtual controller in the immersive content.

3. The control method of claim 2, wherein the interface layout is not displayed on the touch screen on the mobile device.

4. The control method of claim 1, wherein the candidate functions comprise an item-selecting function, the control method comprises:
    in response to the position of the touch event being mapped within the first functional region, selecting the item-selection function as the target function; and
    rendering a first scenario in the immersive content about selecting an item along a direction of a virtual controller.

5. The control method of claim 1, wherein the candidate functions comprise a trigger function, the control method comprises:
    in response to the position of the touch event being mapped within the second functional region, selecting the trigger function as the target function; and
    rendering a second scenario in the immersive content about pulling a trigger along a direction of a virtual controller.

6. The control method of claim 1, wherein the candidate functions comprise a control menu function, the control method comprises:
  in response to the position of the touch event being mapped within the third functional region, selecting the control menu function as the target function; and
  rendering a third scenario in the immersive content about showing a control menu in front of a virtual controller.

7. The control method of claim 1, wherein the candidate functions comprise an application listing function, the control method comprises:
  in response to the position of the touch event being mapped within the fourth functional region, selecting the application listing function as the target function; and
  executing a fourth scenario in the immersive content about showing an application list.

8. The control method of claim 1, wherein the interface layout comprises a blocked region, the control method comprises:
  in response to the touch event locating on the blocked region of the interface layout, ignoring the touch event.

9. The control method of claim 8, wherein the blocked region is located between a U-shaped boundary line, a left edge of the interface layout, a bottom edge of the interface layout and a right edge of the interface layout.

10. The control method of claim 1, wherein the target function is selected further according to a touch gesture of the touch event, the touch gesture is one of click, double click, press-and-hold and drag.

11. A mobile device, comprising:
  a communication circuit, configured to communicate with a head-mounted display device;
  a touch screen, configured to detect a touch event;
  a processing circuit, coupled with the communication circuit and the touch screen, wherein the processing circuit is configured to:
  process the touch event in reference with an interface layout defined on the touch screen, the interface layout comprising a plurality of functional regions, wherein the functional regions of the interface layout comprises a first functional region, a second functional region, a third functional region and a fourth function region, and the functional regions are isolated from each other, the functional regions are isolated from each other by X-shaped boundary lines, the first functional region is located between a left edge of the interface layout and the X-shaped boundary lines, the second functional region is located between a right edge of the interface layout and the X-shaped boundary lines, the third functional region is located between a top edge of the interface layout and the X-shaped boundary lines, and the fourth function region is located between a bottom edge of the interface layout and the X-shaped boundary lines;
  select a target function from candidate functions by mapping a position of the touch event with one of the functional regions in the interface layout;
  generating pose data and transmitting the pose data to the head-mounted display device, wherein a virtual controller is rendered in an immersive content displayed by the head-mounted display device according to the pose data of the mobile device, a direction of the virtual controller is decided by the pose data and points toward an item in the immersive content other than the virtual controller; and
  transmit a control signal to the head-mounted display device for activating the target function on the item pointed by the virtual controller.

12. The mobile device of claim 11, wherein the interface layout is not displayed on the touch screen on the mobile device.

13. The mobile device of claim 11, wherein the interface layout comprises a blocked region, in response to the touch event locating on the blocked region of the interface layout, the processing circuit ignores the touch event.

14. The mobile device of claim 13, wherein the blocked region is located between a U-shaped boundary line, a left edge of the interface layout, a bottom edge of the interface layout and a right edge of the interface layout.

15. The mobile device of claim 11, wherein the target function is selected further according to a touch gesture of the touch event, the touch gesture is one of click, double click and press-and-hold.

* * * * *